US012687765B1

(12) United States Patent

Motsenbocker et al.

(10) Patent No.: US 12,687,765 B1
(45) Date of Patent: Jul. 21, 2026

(54) PRESSURE-TOLERANT UNDERWATER IMAGING SYSTEMS

(71) Applicant: University of Rhode Island Board of Trustees, Kingston, RI (US)

(72) Inventors: Breanna E. Motsenbocker, North Kingstown, RI (US); Brennan T. Phillips, Wakefield, RI (US)

(73) Assignee: University of Rhode Island Board of Trustees, Kingston, RI (US)

( * ) Notice: Subject to any disclaimer, the term of this patent is extended or adjusted under 35 U.S.C. 154(b) by 50 days.

(21) Appl. No.: 18/427,699

(22) Filed: Jan. 30, 2024

Related U.S. Application Data

(60) Provisional application No. 63/442,967, filed on Feb. 2, 2023.

(51) Int. Cl.
 *G03B 17/08* (2021.01)
 *G03B 17/14* (2021.01)
(52) U.S. Cl.
 CPC ............ *G03B 17/08* (2013.01); *G03B 17/14* (2013.01)
(58) Field of Classification Search
 CPC ................................ G03B 17/08; G02B 7/022
 See application file for complete search history.

(56) References Cited

U.S. PATENT DOCUMENTS

| | | | | | |
|---|---|---|---|---|---|
| 5,148,195 A | * | 9/1992 | Albrecht | ................ | G02B 23/22 396/29 |
| 7,066,663 B2 | * | 6/2006 | Cheng | .................... | G03B 17/08 396/27 |
| 8,330,854 B2 | | 12/2012 | Kossin | | |
| 11,181,714 B2 | * | 11/2021 | Aiba | ...................... | G02B 7/026 |
| 11,303,797 B1 | | 4/2022 | Phillips | | |
| 2010/0098398 A1 | * | 4/2010 | Dobell | ..................... | G03B 3/10 396/144 |

FOREIGN PATENT DOCUMENTS

JP          2016189547 A  * 11/2016

OTHER PUBLICATIONS

John S. Laudo, Ken Wurm, Cliff Dodson, "Liquid-filled underwater camera lens system," Proc. SPIE 3482, International Optical Design Conference 1998, (Sep. 21, 1998); https://doi.org/10.1117/12.321967 (Year: 1998).*

(Continued)

*Primary Examiner* — Leon W Rhodes, Jr.
(74) *Attorney, Agent, or Firm* — Peacock Law P.C.; Philip D. Askenazy

(57) ABSTRACT

An underwater camera capable of withstanding full ocean depths. The lens assembly can be filled with any liquid, since the image sensor and other electronics are in an epoxy-filled case which not only can withstand extreme pressures but also protects the electronics from the liquid. Thus, when the camera is intended to be submerged in seawater, for example, unlike existing cameras the lens assembly can hold seawater, which closely matches the index of refraction of the external medium. This simplifies the lens design and eliminates the need for a dome port and a pressure housing. The camera is focusable and zoomable, and it is simple to select specific lens components and the interior liquid to achieve the desired optical parameters. The camera's components can be inexpensively manufactured via 3D printing.

23 Claims, 11 Drawing Sheets

(56)    References Cited

OTHER PUBLICATIONS

Agrawal, A. , et al., "A Theory of Multi-Layer Flat Refractive Geometry", 2012 IEEE Conference on Computer Vision and Pattern Recognition, Providence, RI, USA, 2012, 3346-3353.

Bingham, N. , "Designing pressure-tolerant electronic systems", Unmanned Underwater Technology, White Paper., 2013.

Bradski, G. , "The OpenCV Library", Dr. Dobb's Journal of Software Tools, 2000.

Breddermann, K. , et al., "Printed pressure housings for underwater applications", Ocean Engineering, vol. 113, 2016, 57-63.

Calambokidis, J. , et al., "Insights into the underwater diving, feeding, and calling behavior of blue whales from a suction-cup-attached video-imaging tag (CRITTERCAM)", Marine Technology Society Journal, 41(4), 2007, 19-29.

CATS , "CATS Cam—Customized Animal Tracking Solutions", www.cats.is/products/cats-cam, 2020.

CATS , "CATS-Cam Wireless Multi Sensor-controlled HD Cam Data Sheet", CASTS-Cam v.3.1.0., 2017.

Cazenave, F. , et al., "SeeStar: A low-cost, modular and open-source camera system for subsea observations", Oceans—St. John's, 2014, 1-7.

Crystal Cam Imaging, Inc. , "Crystal Cam Amber Fact Sheet", www.crystalcam.ca, 2016.

Gelze, J. , et al., "On the way to a pressure-tolerant imaging system", Oceans'11 MTS/IEEE Kona, 2011, 1-4.

Goldbogen, J.A. , et al., "Using digital tags with integrated video and inertial sensors to study moving morphology and associated function in large aquatic vertebrates", The Anatomical Record, 300(11), 2017, 1935-1941.

Helmholtz, Petra , et al., "Investigation of Chromatic Aberration and Its Influence on the Processing of Underwater Imagery", Remote Sensing, vol. 12, No. 18, 2020, 1-31.

Holzschuh, J. E., et al., "A pressure tolerant TV camera", IEEE Journal of Oceanic Engineering, vol. 3, No. 1, 22-27.

Kampmann, P. , et al., "Hybrid Pressure-Tolerant Electronics", Oceans, 2012, 1-5.

Lee, G. J., et al., "Bioinspired Artificial Eyes: Optic Components, Digital Cameras, and Visual Prostheses", Advanced Functional Materials, vol. 28, 1705202, 2018, 1-17.

Little Leonardo Co. , "Video logger", http://l-leo.com/eng/video-logger, 2019.

Maas, Hans-Gerd , "New developments in Multimedia Photogrammetry", Symposium A 236 Quarterly Journal in Modern Foreign Literatures, vol. 8, No. 3, 1995, 150-155.

Marshall, Greg , et al., "An advanced solid-state animal-borne video and environmental data-logging device ("Crittercam") for marine research", Marine Technology Society Journal, vol. 41, No. 2, 2007, 31-38.

Menna, Fabio , et al., "Geometric and optic characterization of a hemispherical dome port for underwater photogrammetry", Sensors (Switzerland), vol. 16, No. 1, 2016, 1-21.

Menna, F. , et al., "Mitigating Image Residuals Systematic Patterns in Underwater Photogrammetry", Int. Arch. Photogramm. Remote Sens. Spatial Inf. Sci., vol. XLIII-B2-2020, 2020, 977-984.

Millard, R. C., et al., "Instruments and Methods: An Index of Refraction Algorithm for Seawater Over Temperature, Pressure, Salinity, Density, and Wavelength", Deep-Sea Research, vol. 37, No. 12, 1990, 1909-1926.

Mohammed, Javeed Shaikh, "Applications of 3D printing technologies in oceanography", Methods in Oceanography, vol. 17, 2016, 97-117.

Morgan, J. , et al., "Introduction to Geometrical and Physical Optics", American Journal of Physics, vol. 21, No. 9, 1953, 659.

Nocerino, E. , et al., "Bundle Adjustment With Polynomial Point-To-Camera Distance Dependent Corrections for Underwater Photogrammetry", Int. Arch. Photogramm. Remote Sens. Spatial Inf. Sci., vol. XLIII-B2-2021, 2021, 673-679.

Phillips, Brennan T., et al., "DEEPi: A miniaturized, robust, and economical camera and computer system for deep-sea exploration", Deep-Sea Research Part I: Oceanographic Research Papers, vol. 153, 2019, 1-5.

Phillips, Brennan T., et al., "First in situ observations of the sharpnose sevengill shark (*Heptranchias perlo*), from the Tongue of the Ocean, Bahamas", Journal of the Ocean Science Foundation, vol. 32, 2019, 17-22.

Raspberry Pi Foundation , "Raspberry Pi Camera Module Documentation", https://www.raspberrypi.org/documentation/hardware/camera/, 2019.

Rosen, H. , et al., "Chromogenic behaviors of the Humboldt squid (*Dosidicus gigas*) studied in situ with an animal-borne video package", Journal of Experimental Biology, 218(2), 2015, 265-275.

She, M. , et al., "Refractive geometry for underwater domes", ISPRS Journal of Photogrammetry and Remote Sensing, vol. 183, 2022, 525-540.

Thiede, C. , et al., "An overall pressure tolerant underwater vehicle: DNS Pegel", Oceans 2009-Europe, Bremen, Germany, 2009, 1-6.

Treibitz, T., et al., "Flat refractive geometry", IEEE Transactions on Pattern Analysis and Machine Intelligence, vol. 34, No. 1, 2012, 51-65.

Vogt, D. , et al., "Shipboard design and fabrication of custom 3D-printed soft robotic manipulators for the investigation of delicate deep-sea organisms", PLoS One, vol. 13, No. 8, 2018, 1-16.

* cited by examiner

PRESSURE-TOLERANT UNDERWATER IMAGING SYSTEMS

CROSS-REFERENCE TO RELATED APPLICATIONS

This application claims priority to and the benefit of the filing of U.S. Provisional Patent Application No. 63/442,967, entitled "PRESSURE-TOLERANT UNDERWATER IMAGING SYSTEMS", filed on Feb. 2, 2023, the entirety of which is incorporated herein by reference.

STATEMENT REGARDING FEDERALLY SPONSORED RESEARCH AND DEVELOPMENT

This invention was made with government support under Contract No. N00014-21-1-2656 awarded by the Office of Naval Research. The government has certain rights in the invention.

BACKGROUND OF THE INVENTION

Note that the following discussion may refer to a number of publications and references. Discussion of such publications herein is given for more complete background of the scientific principles and is not to be construed as an admission that such publications or references, or those submitted in any invention disclosure statement submitted for this patent application, are prior art for patentability determination purposes or are relevant to the present invention, per 37 C.F.R. § 1.97 (h).

Deep-sea imaging systems are traditionally expensive to manufacture and are physically scaled depending on the operating depth of their housing and the internal camera/lens components. Many traditional deep-sea imaging systems are off the shelf cameras and lens assemblies that are placed inside heavy, expensive metal housings with pressure-resistant clear viewports. They typically require a 1-atmosphere dry housing that is made of strong metals (e.g., aluminum, stainless steel, titanium) and have a sealed flat or dome viewport made of acrylic, glass, or sapphire. The design of these pressure housings directly scales with their pressure/depth rating, so the size and cost of these cameras increases significantly depending on the desired operating depth. Furthermore, the interface of clear material viewports (glass, acrylic, sapphire) against the rest of the housing material (aluminum, stainless steel, titanium, plastic) is often a source of fatigue/failure. Finally, in conventional underwater camera designs the clear viewport itself acts as an additional optical component that must be considered when achieving good image projection on the camera sensor.

Recent advances in marine technology have been focused on developing smaller, low-cost cameras to make deep-sea research and exploration more accessible. However, these cameras are still pressure sensitive due to the implodable air volumes within the housing and camera. Liquid filling deep-sea housings and electronics is a common method for designing pressure tolerant technology as a way to reduce the cost and size of deep-sea housings. A benefit to a liquid-filled camera relates to image distortion, which is a common concern with underwater cameras. Traditional underwater cameras with a flat viewport experience an increase in radial and translational distortions due to the change in the index of refraction (IOR) from the external medium (seawater) to the internal medium (air). Using a dome port can reduce these distortions, but integrating a dome port into an underwater housing is expensive and often difficult to manufacture.

Liquid-filled cameras have been studied but have not been used because changing the medium inside the lens has a significant impact on the optical pathways of light, and limited liquid options exist that are both dielectric and optically clear. For any liquid-filled camera, a custom lens must be made, which may not be economically feasible based on the optical ray tracing software required and the cost of manufacturing prototypes. Previous liquid filled lenses have been prime lenses (set focal length) and the internal fluid was required to be a dielectric (i.e. non-conductive), since it directly contacted the image sensor; thus salt water could not be used. One example was based around a black and white camera and had poor lens properties (field of view less than 20 degrees, fixed f/# at 8.0). Another attempt utilized a stainless steel housing, which can be expensive and requires specialized equipment to make, had a set focal length that could not be changed, and the only way to focus the lens was by tightening or loosening screws on the front.

SUMMARY OF THE INVENTION

An embodiment of the present invention is a camera comprising a focusable lens assembly configured to contain a liquid; and a case attached to the lens assembly, the case containing an imaging sensor and the case filled with cured epoxy; wherein the cured epoxy prevents the liquid from contacting the imaging sensor. The case is preferably manufactured using 3D printing. The cured epoxy is preferably substantially free of air bubbles and preferably fills the volume of the camera so that the camera does not substantially comprise any air cavities. The liquid preferably comprises pure water, saltwater, seawater, alcohol, ethanol, isopropyl alcohol, or deionized water. The focal length of the camera preferably depends upon a composition of the liquid. The liquid is optionally not a dielectric liquid. The liquid has approximately the same refractive index as a fluid in which the camera is to be submersed. The camera preferably comprises a tube to equalize a pressure of the liquid to a pressure of the fluid when the camera is submersed in the fluid. The lens assembly preferably does not require a housing. The lens assembly is preferably interchangeable, focusable, and/or zoomable. The lens assembly preferably comprises a threaded lens holder rotatably mateable with a threaded lens chamber. The lens holder and lens chamber are preferably manufactured using 3D printing. Rotating the lens holder with respect to the lens chamber preferably focuses and/or zooms the lens. The preferably comprises one or more rotatable magnets magnetically coupled to one or more magnetic elements in the lens holder. The lens assembly preferably comprises an achromatic lens. The camera preferably further comprises a liquid-tight housing for receiving the case, the housing containing a computer, a battery, and Wi-Fi communication electronics. A predetermined focal length, field of view, and aperture of the camera is preferably determined by the user's choice of liquid and one or more lenses in the lens assembly. The camera is preferably capable of operating to 10,900 meters of sea water (msw). The camera can preferably form part of a stereo or multi-camera array. The camera is preferably capable of taking continuous video.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION OF EMBODIMENTS OF THE INVENTION

Figures 1, 2A:
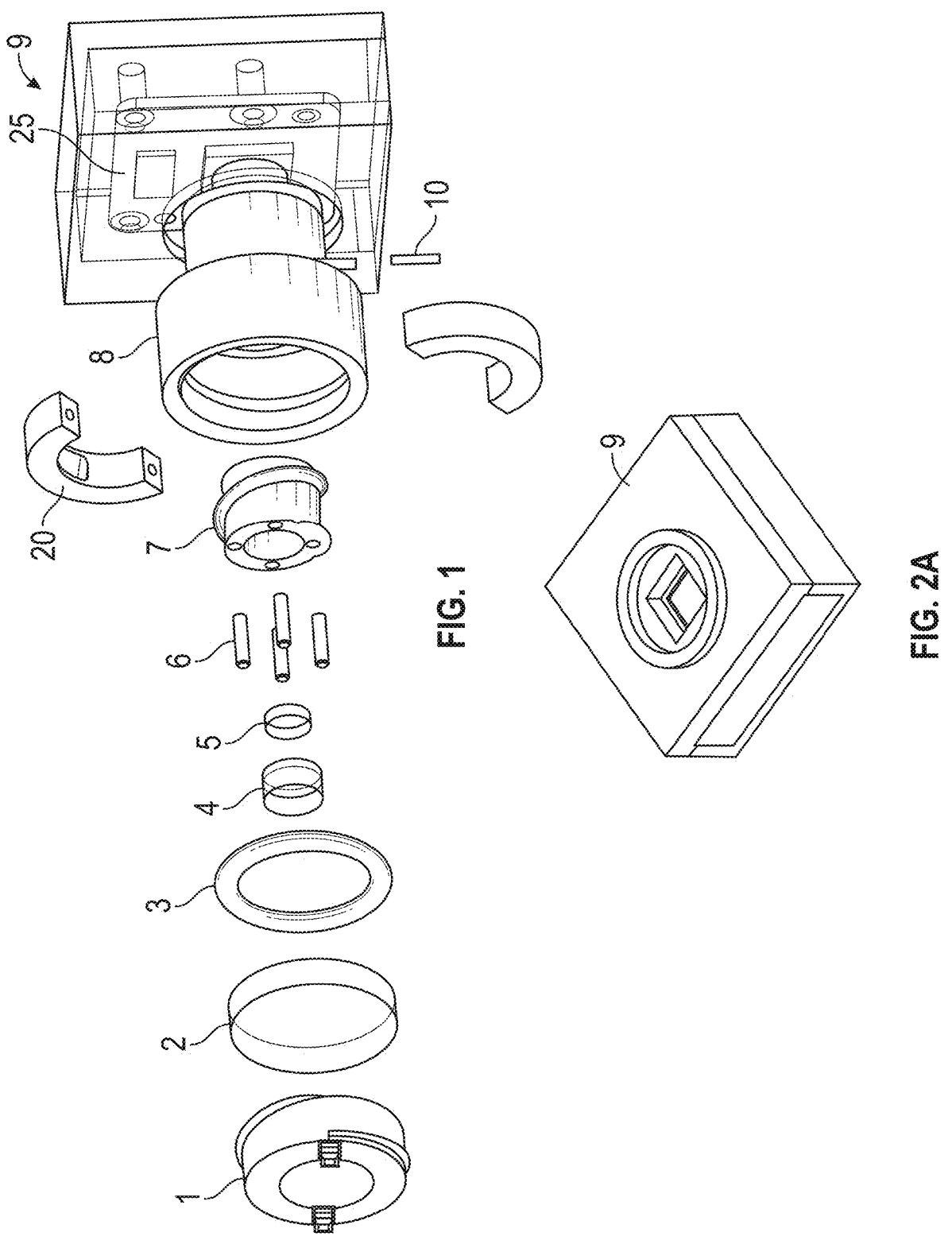
FIG. 1 is an exploded view of an embodiment of an imaging system of the present invention.
FIG. 2A shows the case for the printed circuit board (PCB) and imaging sensor of the present invention.
Figure 2B:
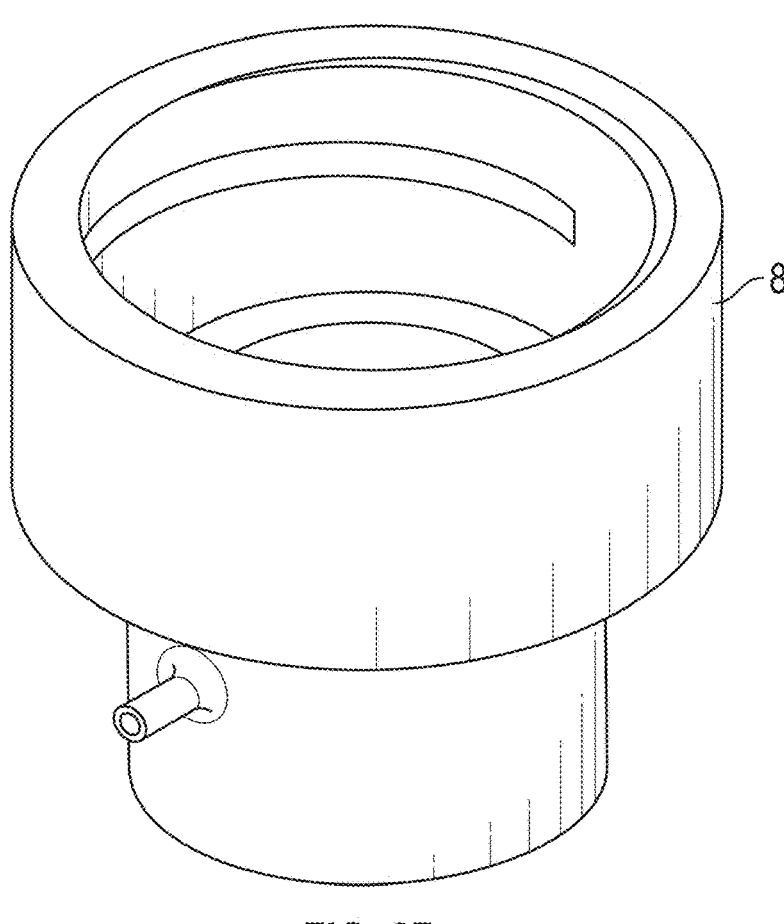
FIG. 2B shows the lens chamber comprising internal threads for receiving the lens holder and a connection for the compensator of the present invention.
Figure 2C:
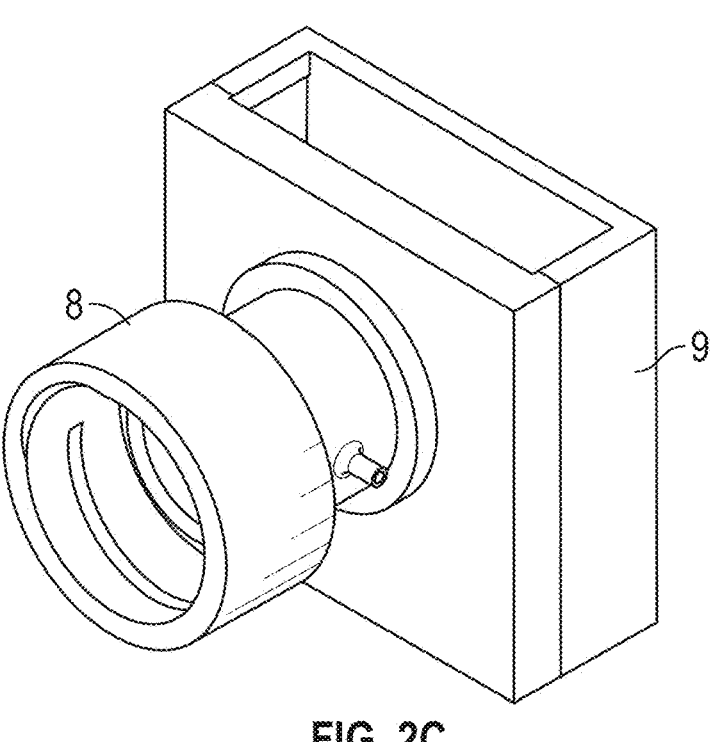
FIG. 2C shows the PCB case and lens chamber assembly of the present invention.
Figure 2D:
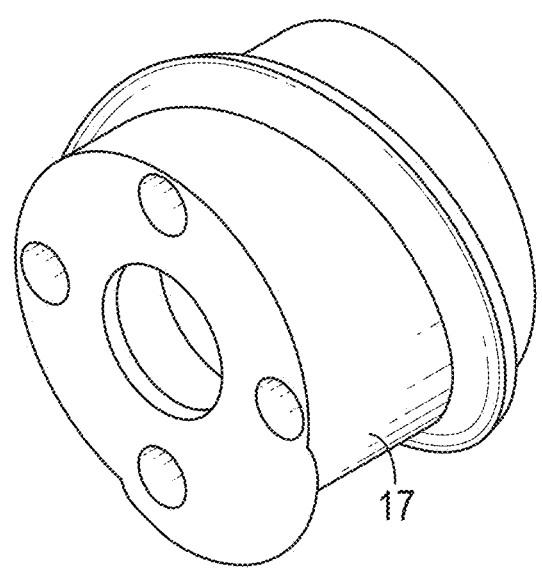
FIG. 2D shows the lens holder comprising threads and circular slots for steel pins of the present invention.

Embodiments of the pressure tolerant camera of the present invention are preferably compact, low cost, and manufactured using stereolithography (SLA) 3D printing methods, which also enables rapid prototyping. The depth/pressure rating is preferably not dependent on the thickness of optical viewports or external housings. The assembly of the present invention preferably comprises a CMOS imaging sensor, a 3D printed lens assembly (preferably comprising off-the-shelf glass components) filled with liquid, and a magnetic focus mechanism. These elements are preferably disposed in a 3D printed case that is filled with a thin layer of optically clear rigid epoxy that is cured in a elevated pressure environment (preferably approximately 2-3 atmospheres above ambient) to remove air bubbles. The epoxy coating preferably removes all implodable air volumes within the camera, and, because the imaging sensor is preferably completely coated in epoxy, the electronic components are protected from the ambient pressure and from the liquid in the lens chamber, thus preventing any corrosion or short circuiting of the electronics caused by the liquid, especially when the electronics are in use.

The internal liquid, which is preferably directly exposed to ambient pressure, thus preferably does not come in direct contact with the image sensor electronics, enabling the use of a wide range of internal liquid media, including electrically conductive, non-dielectric, or dielectric media, that can be chosen based on index refraction or other considerations to produce a clear image, as long as the liquid chosen does not act as a solvent for the components it contacts. The liquid is preferably chosen and/or tuned based on the surrounding medium (freshwater, saltwater, or any other fluid the camera may be immersed in), for example pure water, deionized water, saltwater, or alcohol such as ethanol or isopropyl alcohol. Images taken with the camera of the present invention preferably have minimal image distortions when compared to other underwater cameras with flat viewports, preferably because when the internal liquid is the same as the surrounding liquid medium there is a minimal difference between their refractive indices, making the optical corrections for the projected image on the sensor become much more straightforward. For example, with seawater, the internal and external media may differ in salt content and/or temperature, slightly changing the index of refraction (IOR). By maintaining the optical ray path from the object to the sensor many of these distortions are mitigated. This reduces the need for a hemispherical dome port, which is a substantial benefit due to the cost and manufacturing process associated with integrating dome ports into underwater housings. Because the lens assembly is pressure tolerant and does not require a housing, embodiments of the present invention negate the need for a separate flat or dome viewport altogether. Another way to reduce image distortion is using calibration to correct the image, but this requires taking new calibration photos every time the camera is adjusted or changes focal lengths. In addition, changing the liquid preferably enables the user to achieve longer or shorter focal lengths without buying more expensive glass lenses.

Figure 7:
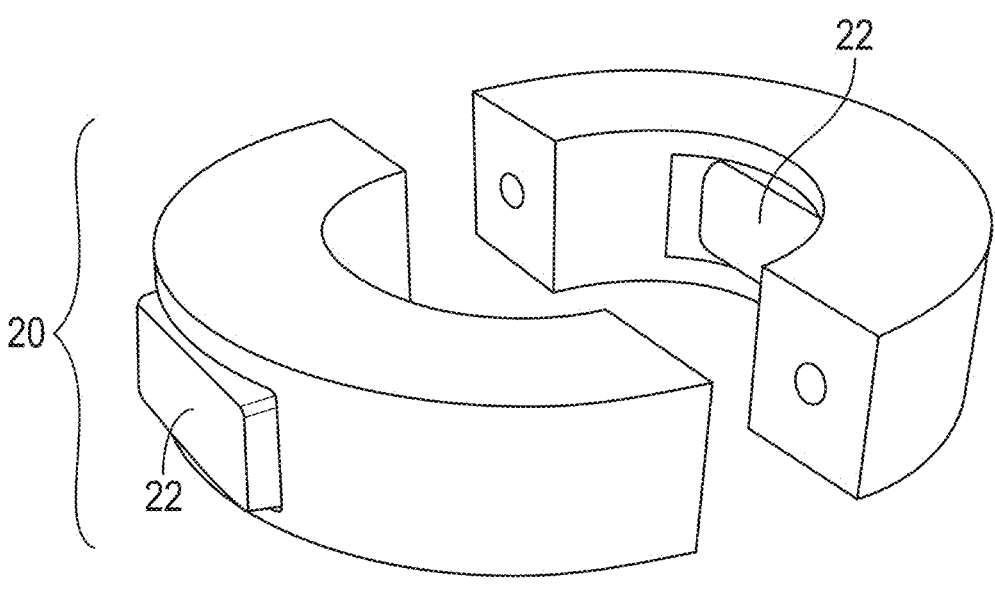
FIG. 7 shows one half of the magnet holder, comprising a magnet used to drive magnetic focusing and/or zooming of the lens.

The lens assembly is preferably interchangeable and can be designed or customized to achieve specific focal lengths, apertures, and other image-forming properties. The assembly preferably comprises an achromatic lens to maintain the focal length of the system under pressure. The glass lenses are preferably disposed in a separate lens holder, and the lens holder and lens chamber preferably comprise printed external threads so the lens holder can be rotated in and out of the chamber for focusing. The present invention preferably comprises focus and zoom capabilities using a magnetically driven focus mechanism, which can be operated without opening the lens chamber and reintroducing air into the internal volume, thus minimizing risk of damage to the lenses and sensor. The lens holder preferably comprises slots to receive pins, which preferably comprise steel or another magnetic material. One or more magnets on the outside of the lens are preferably used to drive the pins to rotate the lens holder to focus and/or zoom the camera. As the magnets rotate around the outside, the lens holder inside will rotate and move in and out of the chamber as it follows the helical track of the threads. While any number of pins and magnets may be used, when two magnets are used, as shown in FIG. 7, it is easier to "catch" the pins when there are four pins. The magnets may be rotated manually when the device is on the surface, or via a motor.

The end of the lens chamber preferably comprises a thin optical viewport that is compressed against an o-ring to seal the internal volume of the lens. A flexible tube is preferably attached to the lens chamber to act as a passive pressure compensator for the internal fluid. The flexible tube is preferably sealed off from the external liquid. As the camera experiences an increase in pressure, the liquid on the inside will slightly compress (typically between about 5% and about 10% for full ocean depth). The liquid in the flexible tube acts as a reservoir of extra liquid; when the pressure increases the tube gets squeezed and the extra liquid fills in the internal volume to compensate the loss of volume from compression.

EXAMPLE

Figure 3:
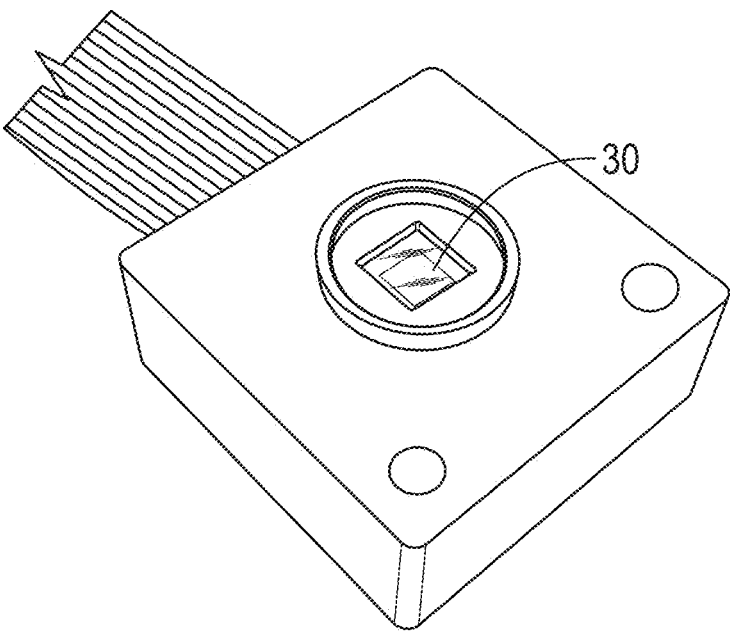
FIG. 3 is a drawing of an embodiment of the 3D printed case for holding the sensor and PCB.
Figure 4A:
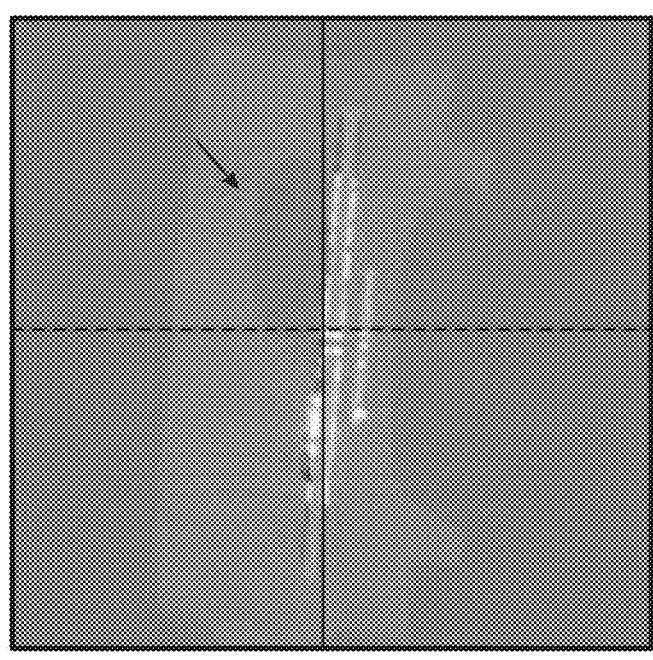
FIGS. 4A-4B are x-ray images of the epoxy potted case containing the printed circuit board (PCB) and sensor of the imaging system showing an air bubble (indicated by the arrow) and showing no air bubble after adjusting the method of pouring the epoxy, respectively.
Figure 4B:
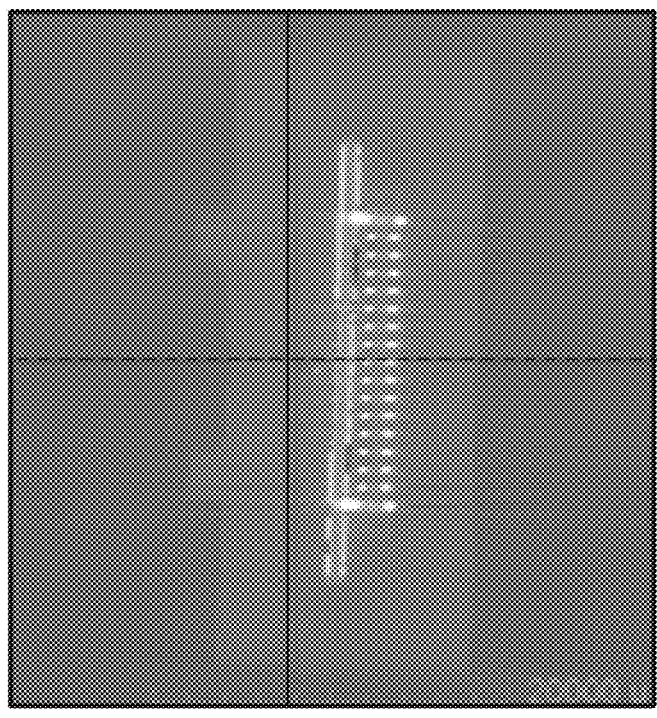

An imaging system of the present was manufactured and tested. The overall system design was based around an 8 MP Sony IMX219 sensor from a Raspberry Pi v2 camera module. The factory-installed lens and IR filter was removed from the camera module, leaving a bare CMOS sensor mounted on the PCB. FIG. 1 shows an exploded view of the imaging system, which comprised screw cap 1 to hold the viewport in place, acrylic viewport 2, O-ring 3, achromatic lens 4, double convex lens 5, pins 6, lens holder 7, lens chamber 8, PCB/sensor case 9 which was filled with clear epoxy, flexible tube 10 for fluid compensation, and magnet holder 20. PCB/sensor case 9, lens chamber 8, lens holder 7, and screw cap 1 were designed in AutoCAD and 3D printed with a Formlabs SLA-based printer using black standard resin; CAD drawings are shown in FIGS. 2A-2D. PCB/ sensor case 9, shown in FIG. 3, which contained the Raspberry Pi v2 camera module PCB 25 and CMOS sensor 30, was filled with Crystal Clear™ 200 epoxy that was cured in an elevated pressure environment (approximately 2-3 atmospheres above ambient pressure) to remove air bubbles, which can cause premature failure of the device. The epoxy-filled system was x-rayed to confirm all air bubbles were removed; x-ray images of the epoxy potted case containing the PCB and sensor showing an air bubble and without an air bubble are shown in FIGS. 4A and 4B, respectively. X-ray imaging was necessary because the use of black resin for the 3D printed parts made it impossible to visually inspect the epoxy.

Figure 5:
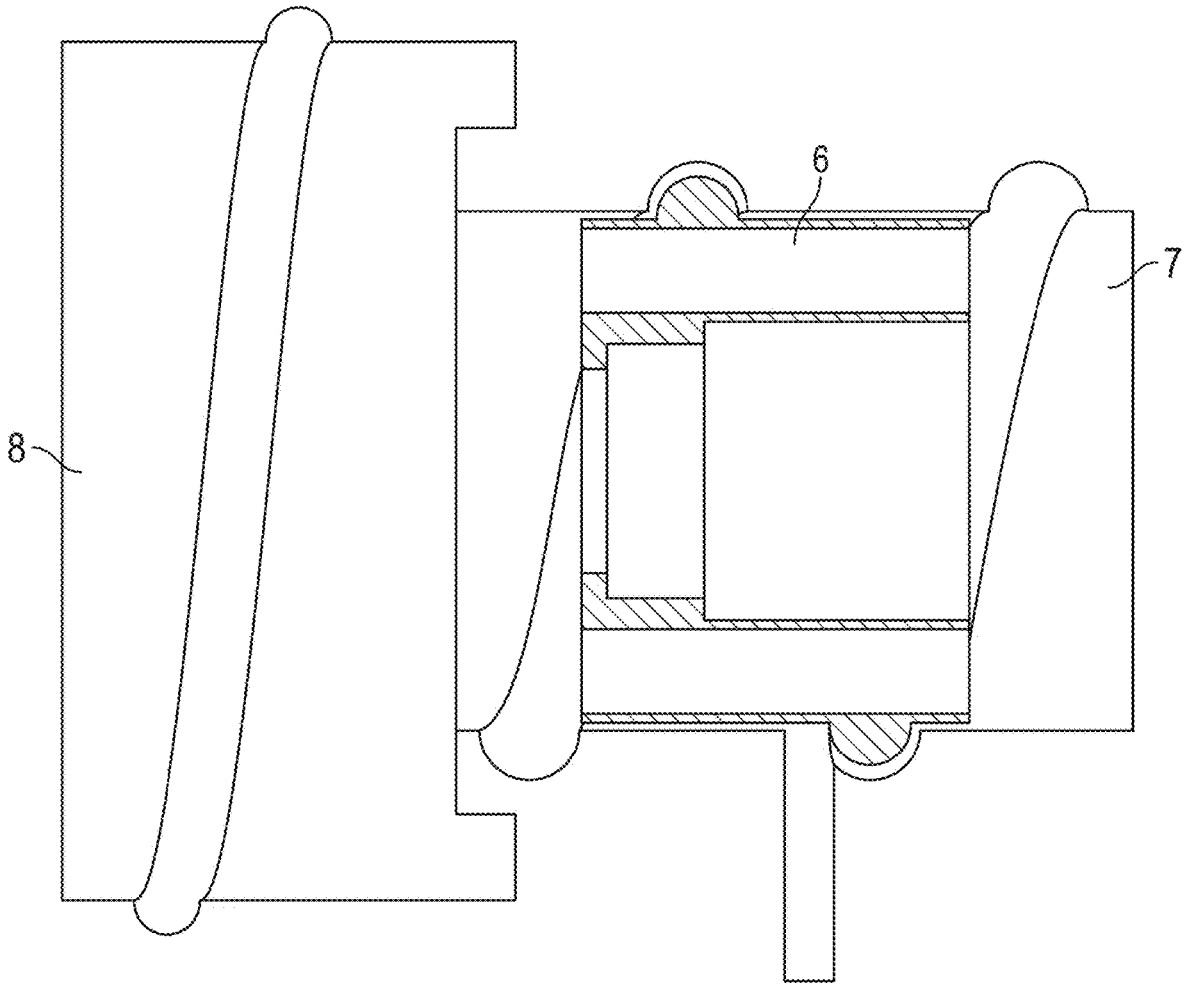
FIG. 5 is a cross sectional view of the lens holder inside the lens chamber.

Lens chamber 8 was attached to PCB/sensor case 9 using clear J-B Weld. The glass lenses were placed inside lens holder 7, which was designed with small tolerances to keep the lenses securely in place. Four slots in lens holder 7 receive pins 6. Lens holder 7 and lens chamber 8 comprise printed external threads, so the rotation of lens holder 7 can translate to linear motion in and out of lens chamber 8 for focusing. A cutaway cross section of the assembly is shown in FIG. 5. On the end of lens chamber 8 is thin optical viewport 2 that was compressed against O-ring 3 using screw cap 1 to seal the internal volume. Flexible tube 10 was attached to lens chamber 8 to act as a passive pressure compensator for the internal fluid. To fill lens chamber thin optical viewport 8 and ensure the removal of all air bubbles, the entire assembly was submerged in deionized water and sealed. The total internal volume of the system was approximately 25 ml.

Figure 6A:
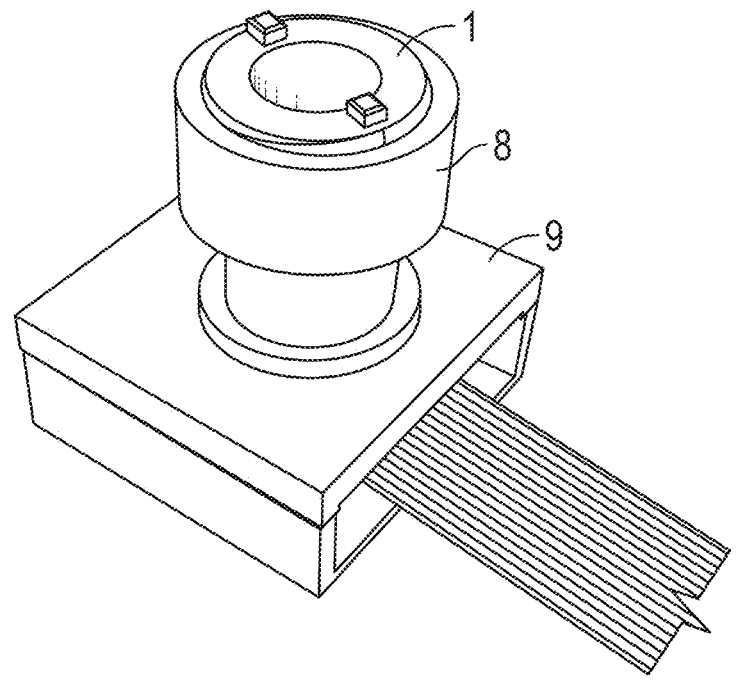
FIG. 6A shows the fully assembled camera of the present invention.
Figure 6B:
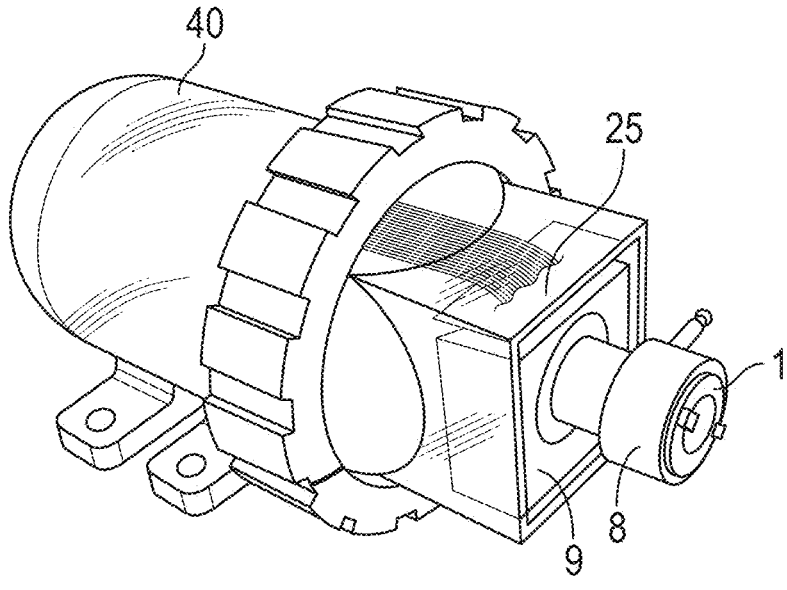
FIG. 6B shows the camera integrated with a 1-atm dry housing for field deployment.

For laboratory testing and field deployments, the fully assembled system, shown in FIG. 6A, was integrated into the endcap of 1-atm, SLA-printed dry housing 40, as shown in FIG. 6B. The endcap was designed with an opening for PCB/sensor case 9. This opening was reinforced and sealed with epoxy, which enabled a ribbon cable pass-through into the body of the housing. This dry housing contained a battery and a Raspberry Pi Zero W computer which made it a self-contained system that can be interfaced via Wi-Fi on the surface. The computer was programmed with an open-source library that enables the camera to take continuous video (https://github.com/URIL-Group/deepi-python), incorporated herein by reference. Magnet holder 20 comprised two halves, each half comprising magnet 22 for focusing and/or zooming the camera, as shown in FIG. 7. The two halves snapped together around the outside of the lens assembly, although they may be attached by any method.

Figure 8:
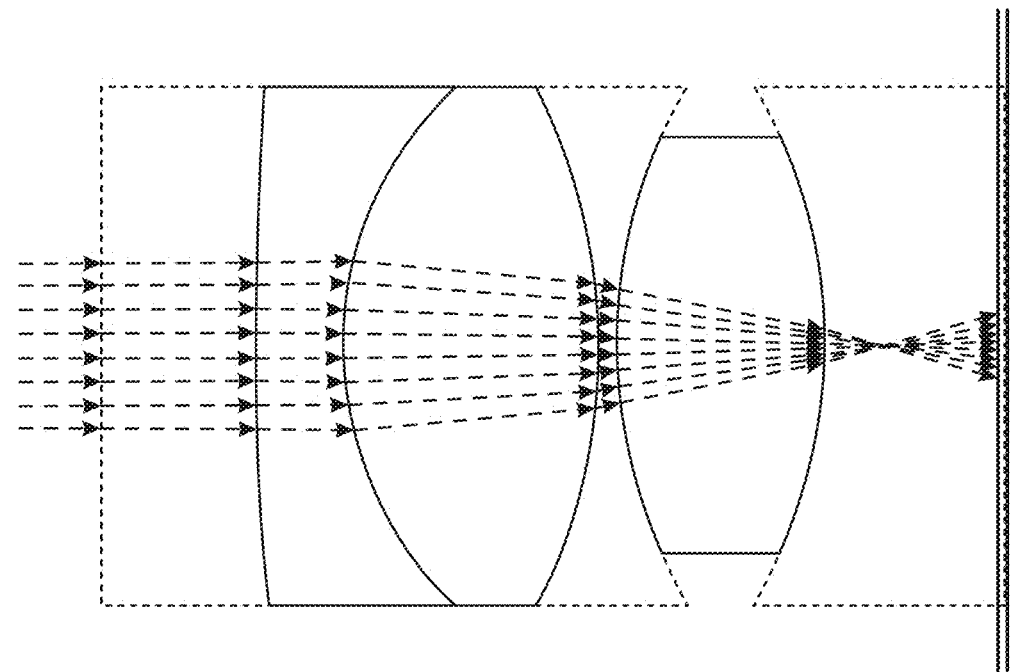
FIG. 8 shows optical ray tracing of the lens assembly created in OpticalRayTracer. The outlines of the glass lenses are solid and the outlines of the liquid lenses are dashed.

The liquid-filled lens assembly was chosen to have a focal length of 8.0 mm, a horizontal field of view of 26°, and an aperture of 1.78. The assembly comprised one double convex lens with an IOR of 1.67 and one achromatic lens which comprised two lenses with an IOR of 1.67 and 1.78 cemented together. The glass optical elements all had an index of refraction (IOR) above 1.65 to maximize the difference between the IOR of the surrounding medium and glass in order to maintain a small focal length. The liquid inside the lens was deionized water, which has an IOR of 1.33. Optical ray tracing for the lens design was calculated using Python. The code is available open source via GitHub (https://github.com/URIL-Group/PresTo), incorporated by reference. This program calculates the effective focal length (EFL), field of view (FOV), and aperture of any lens configuration in any medium. Each cavity of liquid between glass lenses is treated as its own lens, referred to as a liquid lens. The focal length of each liquid lens was calculated using the thick lens maker's equation:

$$\frac{1}{f} = \left(\frac{n_l}{n_m} - 1\right)\left[\frac{1}{R_1} - \frac{1}{R_2} + \frac{d\left(\frac{n_l}{n_m} - 1\right)}{n_p R_1 R_2}\right]$$

where $n_l$ is the refractive index of the lens, $n_m$ is the refractive index of the medium, $R_1$ is the radius of curvature closest to the incoming light (mm), $R_2$ is the radius of curvature closest to the sensor (mm), d is the thickness of the lens (mm), and f is the EFL (mm). This calculation was used in conjunction with OpticalRayTracer, an open-source Java program for designing lenses and mirrors, to visualize the optical pathways of the lens assembly. Visualization of the optical pathways through the glass and liquid lenses from OpticalRayTracer can be seen in FIG. 8.

Figure 9A:
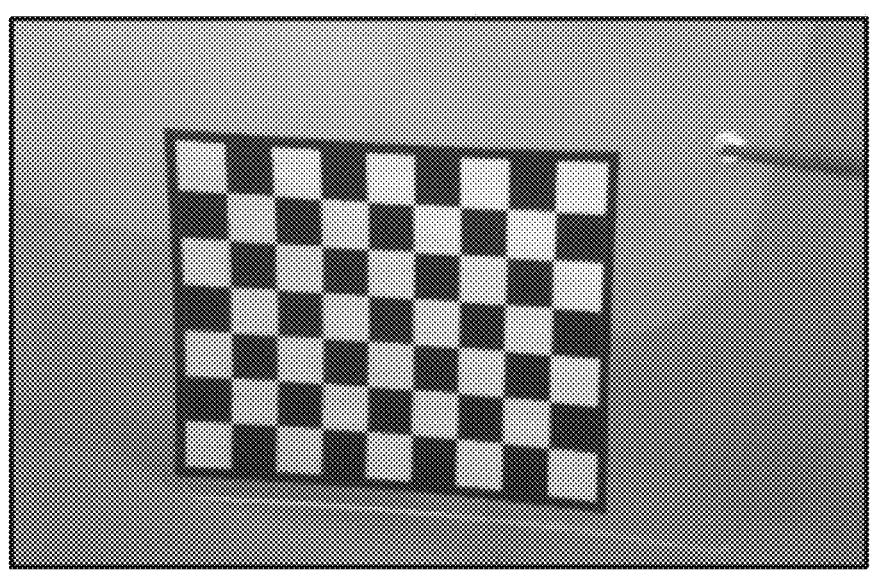
FIG. 9A is a photograph of a 9 in×7 in checkerboard taken underwater with DEEPi, an imaging system that comprises a traditional air-filled camera lens.
Figure 9B:
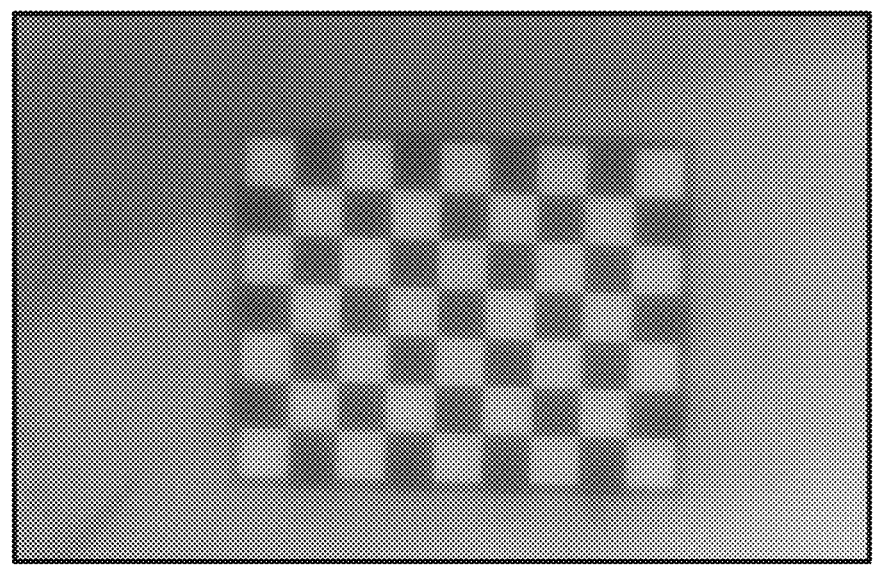
FIG. 9B is a photograph of the checkerboard of FIG. 9A taken using the liquid-filled camera lens of the present invention.

The camera was laboratory calibrated with photos of a 9 in×7 in checkerboard taken at two distances in air and in water. This calibration was also performed using a DEEPi camera to compare image quality and distortions between these cameras. The DEEPi camera has a traditional air-filled lens with a flat viewport and uses the same imaging sensor as the present system, and is described more fully in U.S. Pat. No. 11,303,797, incorporated herein by reference. At least 30 images were taken at each range with each camera and these images were processed using Python OpenCV to confirm lens properties and determine distortion coefficients. A comparison of the checkerboard photos between the present invention and DEEPi, shown in FIGS. 9A and 9B, demonstrates that the present invention reduces underwater image distortions, even though the images it produces has less contrast, resulting in a less sharp image. The images from DEEPi look sharper, but the checkerboard appears to have undergone a pincushion distortion. This distortion gets worse closer to the edges of the frame. Calibration matrices (i.e. the focal lengths and optical centers in the x and y directions) and distortion coefficients were calculated for both cameras and are shown in Tables 1 and 2, respectively. The distortion coefficients confirm that there is a pincushion distortion in the DEEPi images. Using a larger, higher quality sensor could improve the field of view and sharpness of the image taken with the present invention; however, the decreased sharpness of images taken by the present system was most likely due to debris getting into the lens assembly or imperfections on the interior walls of the 3D printed lens assembly.

TABLE 1

| Focal lengths and optical centers of DEEPi and PresTo taken in air. | | | | |
|---|---|---|---|---|
| | $f_x$ (mm) | $f_y$ (mm) | $c_x$ (mm) | $c_y$ (mm) |
| DEEPi | 2.974 | 3.959 | 2.959 | 3.938 |
| PresTo | 8.593 | 9.640 | 7.372 | 8.314 |

TABLE 2

| Distortion coefficients of DEEPi and PresTo taken at two distances underwater. Note the distances are not consistent between cameras due to the difference in the focal lengths. | | | | | |
|---|---|---|---|---|---|
| | k1 | k2 | p1 | p2 | k3 |
| DEEPi (76 cm) | 0.650 | 4.408 | 0.010 | 0.007 | −45.817 |
| DEEPi (102 cm) | 0.638 | 10.533 | 0.017 | 0.013 | −153.859 |
| PresTo (112 cm) | −6.519 | 0.541 | −0.012 | 0.000 | −0.008 |
| PresTo (145 cm) | −3.588 | −2707.621 | 0.154 | 0.042 | 2.711 |

The system was pressure tested in a hydrostatic pressure chamber. Recorded video footage from the system was taken inside the chamber to verify functionality during testing. The system was able to function to a pressure of at least 27.6 MPa, or about 2700 msw (meters of sea water), which was the limit of the testing chamber. It is believed that the present system can, in theory, operate to full ocean depth, which exceeds the pressure rating of almost every commercially available deep-sea camera apart from true abyssal-depth imaging systems such as DSPL's 11 km-rated HD Multi SeaCam (www.deepsea.com). Further testing in a hydrostatic facility that can produce pressures beyond 30 MPa is required to verify this and was not possible within the scope of this study.

Figure 10:
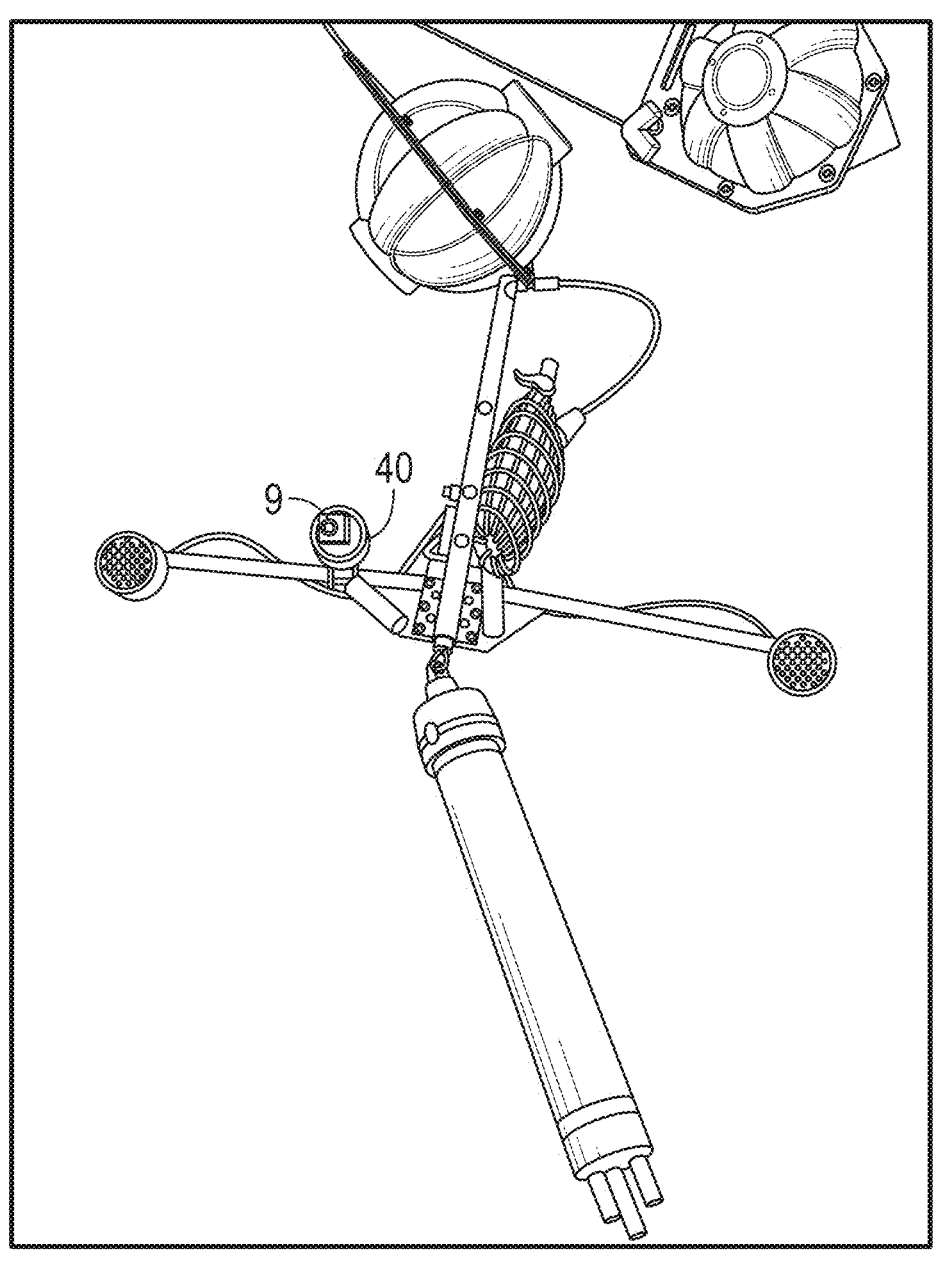
FIG. 10 shows the present invention (indicated by an arrow) attached to a baited remote underwater video (BRUV) for deep-sea deployment in Bermuda.
Figure 11A:
FIG. 11A is an image of a codling (*Antimora rostrata*) taken at 1722 m depth.
Figure 11B:
FIG. 11B is an image of a juvenile black sea bass (*Centropristis striata* Linnaeus, 1758) taken at 10 m depth.
Figure 11C:
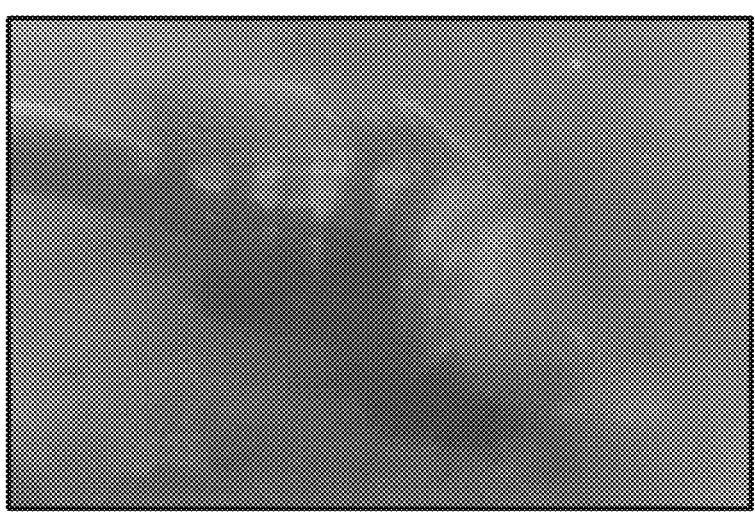
FIG. 11C is an image of a black sea bass (*Centropristis striata*) taken at 10 m depth.
Figure 11D:
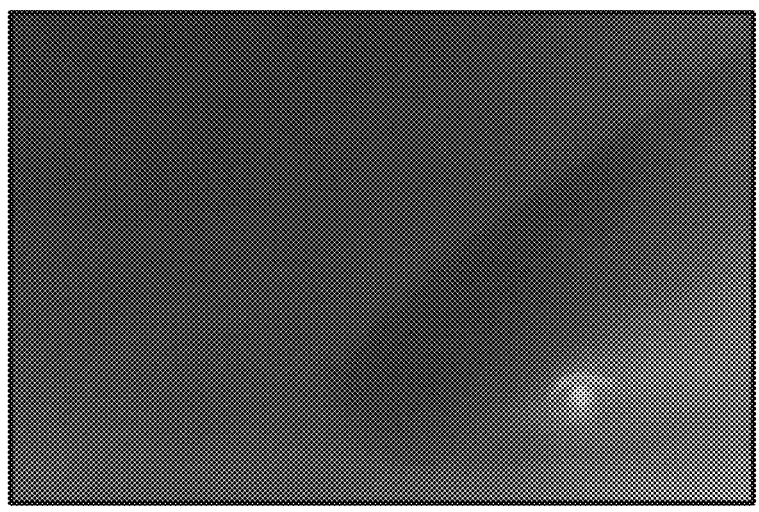
FIG. 11D is an image of bluntnose sixgill shark (*Hexanchus griseus*) taken at 1423 m depth.

The system was deployed five times in the field, two using SCUBA divers for shallow deployments in Rhode Island diving to a maximum depth of 10 meters for 30 minutes, and three deep deployments approximately 6 km off the Northeast coast of Bermuda mounted to a baited remote underwater video (BRUV) system, as shown in FIG. 10. The BRUV used in this study had two LED lights, a glass sphere for floatation, a battery housing, and an Edgetech acoustic release. The first deep deployment was at 1236 m for 6 hours, the second deep deployment was at 1423 m for 17 hours, and the third deep deployment was to 1722 m for 5 hours. The deep deployments measured an average temperature of 4.6° C. The system recorded continuous video while at depth. FIGS. 11A-11D show captured footage of the following deepwater species, respectively: codling (*Antimora rostrata* Günther, 1878), taken at 1722 m depth; juvenile black sea bass (*Centropristis striata* Linnaeus, 1758), taken at 10 m depth; black sea bass (*Centropristis striata*), taken at 10 m depth; and bluntnose sixgill shark (*Hexanchus griseus* Bonnaterre, 1788), taken at 1423 m depth.

Embodiments of the present invention can be produced at a fraction of the cost of most underwater cameras despite their depth rating, with less than $300 in materials per prototype that was manufactured (see the example). The development of low-cost pressure tolerant cameras using 3D printed parts makes deep-sea research and exploration accessible to a broader range of marine scientists and engineers. The present invention can be deployed as a self-contained system with a small form factor, which makes it an easy addition to underwater vehicles, BRUVs, and other platforms. The design of the present invention may also be applicable to deep-rated stereo and multi-camera arrays that utilize short baseline separations. Currently such designs require separate housings for each camera, as each viewport must be symmetrically oriented to the interior lens, or somehow enclosed in a common pressure housing with complex reinforcing geometry.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

The invention claimed is:

1. A camera comprising:
   a focusable lens assembly configured to contain a liquid; and
   a case attached to the lens assembly, the case containing an imaging sensor and the case filled with cured epoxy;
   wherein the cured epoxy prevents the liquid from contacting the imaging sensor.

2. The camera of claim 1 wherein the case was manufactured using 3D printing.

3. The camera of claim 1 wherein the cured epoxy is substantially free of air bubbles.

4. The camera of claim 1 wherein the cured epoxy fills the volume of the camera so that the camera does not substantially comprise any air cavities.

5. The camera of claim 1 wherein the liquid comprises pure water, saltwater, seawater, alcohol, ethanol, isopropyl alcohol, or deionized water.

6. The camera of claim 1 wherein a focal length of the camera depends upon a composition of the liquid.

7. The camera of claim 1 wherein the liquid is not a dielectric liquid.

8. The camera of claim 1 wherein the liquid has approximately the same refractive index as a fluid in which the camera is to be submersed.

9. The camera of claim 8 comprising a tube to equalize a pressure of the liquid to a pressure of the fluid when the camera is submersed in the fluid.

10. The camera of claim 8 wherein the liquid has substantially the same refractive index as the fluid.

11. The camera of claim 1 without a housing for the lens assembly.

12. The camera of claim 1 wherein the lens assembly is interchangeable.

13. The camera of claim 1 wherein the lens assembly is zoomable.

14. The camera of claim 1 wherein the lens assembly comprises a threaded lens holder rotatably mateable with a threaded lens chamber.

15. The camera of claim 14 wherein the lens holder and lens chamber were manufactured using 3D printing.

16. The camera of claim 14 wherein rotating the lens holder with respect to the lens chamber focuses and/or zooms the lens.

17. The camera of claim 14 comprising one or more rotatable magnets magnetically coupled to magnetic elements in the lens holder.

18. The camera of claim 1 wherein the lens assembly comprises an achromatic lens.

19. The camera of claim 1 further comprising a liquid-tight housing for receiving the case, the housing containing a computer, a battery, and Wi-Fi communication electronics.

20. The camera of claim 1 wherein a predetermined focal length, field of view, and aperture of the camera is determined by the user's choice of liquid and one or more lenses in the lens assembly.

21. The camera of claim 1 capable of operating to 10,900 meters of sea water (msw).

22. The camera of claim 1 forming part of a stereo or multi-camera array.

23. The camera of claim 1 capable of taking continuous video.

* * * * *